United States Patent
Sasano

(10) Patent No.: US 7,668,646 B2
(45) Date of Patent: Feb. 23, 2010

(54) NAVIGATION DEVICE HAVING ROUTE GUIDANCE TO PARKING SPOT CLOSE TO BORDER

(75) Inventor: Takanori Sasano, Anjo (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 11/290,555

(22) Filed: Dec. 1, 2005

(65) Prior Publication Data
US 2006/0122770 A1 Jun. 8, 2006

(30) Foreign Application Priority Data
Dec. 7, 2004 (JP) ............................. 2004-354224

(51) Int. Cl.
*G01C 21/00* (2006.01)
(52) U.S. Cl. .................. 701/206; 701/200; 701/201; 701/210; 340/994; 340/995.23; 340/995.27
(58) Field of Classification Search ................. 701/210, 701/200, 201, 206; 340/994, 995.23, 995.27
See application file for complete search history.

(56) References Cited
U.S. PATENT DOCUMENTS
6,078,865 A * 6/2000 Koyanagi ................... 701/211

2004/0102898 A1 * 5/2004 Yokota et al. ............... 701/210

FOREIGN PATENT DOCUMENTS

| JP | A-10-4366 | 1/1998 |
| JP | A-10-82649 | 3/1998 |
| JP | A-11-108685 | 4/1999 |
| JP | A-2000-329568 | 11/2000 |
| JP | A-2002-340597 | 11/2002 |
| JP | A-2005-24507 | 1/2005 |

\* cited by examiner

*Primary Examiner*—Dalena Tran
*Assistant Examiner*—Nikhil Sriraman
(74) *Attorney, Agent, or Firm*—Posz Law Group, PLC

(57) ABSTRACT

A navigation device mounted on an automotive vehicle includes geographical map data, a position detector such as a global navigation system and a device for calculating a driving route from a starting point or a present position to a destination. When the vehicle is going to cross a border such as a national border, the driving route is calculated to include a parking spot close to the border. A driver of the vehicle is guided to temporarily park at the parking spot to obtain local information including traffic regulations in a country he/she is going to enter. Since the local information is given to the driver while he is parking, the driver is able to concentrate on obtaining the local information in detail without sacrificing driving safety.

15 Claims, 7 Drawing Sheets ly of Japanese Patent Application No. 2004-354224 filed on Dec. 7, 2004, the content of which is incorporated herein by reference.

BACKGROUND OF THE INVENTION

1. Field of the Invention

The present invention relates to a navigation device for use in an automotive vehicle, the navigation system including a system for guiding a vehicle to a parking spot close to a border.

2. Description of Related Art

In an area such as Europe, an automotive vehicle often crosses a national border. Traffic regulations and other customs may be different from country to country. A driver has to obey the traffic regulations effective in the country where he/she is driving. To quickly give such traffic regulations to a driver when he/she crosses a state border, JP-A-11-108685 proposes a navigation system. In this system, when it is recognized that the vehicle crosses a border, local information including traffic regulations is given to the driver. In this system, however, such local information is given to the driver while he is driving. Accordingly, it is difficult to give the local information in detail. In addition, the driver is not able to concentrate on receiving the information because he has to concentrate on driving.

SUMMARY OF THE INVENTION

The present invention has been made in view of the above-mentioned problem, and an object of the present invention is to provide an improved navigation device which is able to give a driver local information in detail without sacrificing driving safety.

The navigation device for use in an automotive vehicle includes a device for inputting a geographical map data, a device for specifying a position of the vehicle such as a global positioning system, and a device for calculating a driving route from a starting point or a present position to a destination. The navigation device calculates a driving route from a starting point to a destination upon receiving such a command from a driver. If the vehicle is going to cross a national border, between both sides of which customs and regulations including traffic regulations are different, the navigation device calculates the driving route so that a parking spot close to the border, where the driver is able to park at least for a while, is included in the driving route. When the driver does not command to calculate a driving route and the navigation device determines that the vehicle is going to cross the border, the navigation device automatically calculates a driving route from a present position to a parking spot which is located close to the border.

The vehicle is guided to the parking spot designated by the navigation device and stops there for a while to obtain the local information by means of displays on a display panel or a speaker, both included in the on-board navigation device. The driver can obtain the detailed local information because the information is given while he/she is parking.

It is preferable to designate the parking spot which is located before the border to give the local information before the driver enters a new country. If the vehicle stops at a place other than the designated parking spot, which is located within a predetermined distance from the border, the local information may be given to the driver at that place. In this case, the designated parking spot is canceled from the driving route not to repeatedly give the same information to the driver. The border is not limited to the national border, but it may be any regional border including a state border, between both sides of which the regulations including traffic regulations are different.

According to the present invention, a driver is able to obtain detailed local information including traffic regulations effective in a country he/she is going to enter at a parking spot located close to the border. Since the local information is obtained while parking, driving safety is not sacrificed. Other objects and features of the present invention will become more readily apparent from a better understanding of the preferred embodiment described below with reference to the following drawings.

DETAILED DESCRIPTION OF THE PREFERRED EMBODIMENT

Figure 1:
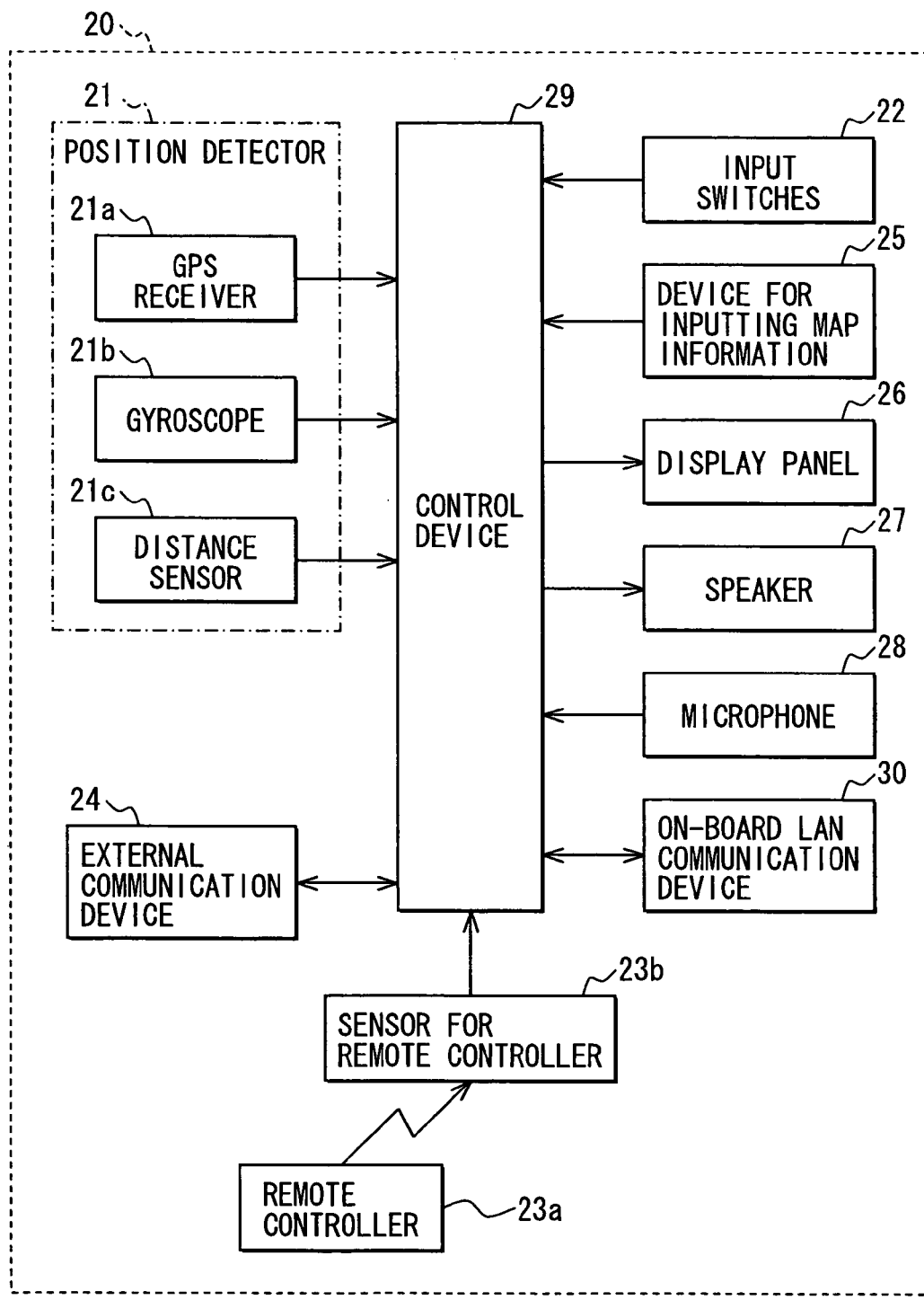
FIG. 1 is a block diagram showing an entire structure of a navigation device according to the present invention.

A preferred embodiment of the present invention will be described with reference to accompanying drawings. First, referring to FIG. 1, an entire structure of a navigation device 20 according to the present invention will be described. The navigation device 20 is mounted on an automotive vehicle. The navigation device 20 includes: a position detector 21 for detecting a present position of a vehicle; input switches 22 for inputting various commands to the navigation device; a remote controller 23a (separate from the input switches) for inputting various commands; a remote sensor 23b for receiving signals from the remote controller 23a; an external communication device 24 for performing communication through external networks such as a packet communication network; a device 25 for inputting information stored in media storing map data, voice data and the like; a display panel 26 for displaying route maps and other information; a speaker for giving voice information to a driver; a microphone 28 for receiving driver's voice commands or requests; an on-board LAN communication device 30; and a control device 29 for processing various inputs and controlling the external communication device 24, the display panel 26, the speaker 27 and the on-board LAN communication device.

The position detector 21 is composed of: a GPS (global positioning system) receiver 21a for receiving signals from GPS satellites and outputting the received signals; a gyroscope 21b for detecting a rotational motion of a vehicle; and a distance sensor 21c for detecting a distance driven by the vehicle. The control device 29 calculates a present position of the vehicle, a driving direction, a driving speed and others based on inputs from the GPS receiver 21a, the gyroscope 21b and distance sensor 21c. The present position of the vehicle can be calculated according to various methods including a single direction measurement method and a relative direction measurement method. It is possible to use any method in this embodiment.

The input switches 22 include mechanical key switches positioned near the display panel 26 and a touch panel constituted integrally with the display panel 26. The touch panel may be constituted by using various systems such as a pressure-sensitive system, an electromagnetic-inductive system or an electrostatic system, or a combination thereof. It is possible to use any system in this embodiment.

The external communication device 24 receives information including a traffic jam and a traffic accident from roadside devices such as an optical beacon device or an electromagnetic beacon device. The external communication device 24 is linked to a packet communication network, and it communicates with servers connected to the packet communication network.

The inputting device 25 inputs data stored in a map-data media such as a hard disk or a DVD-ROM. The map-data media stores various data including a map data (node data, link data, cost data, background data, road data, name data, mark data, intersection data, service facility data, parking spot data, etc.), voice data for guidance, and voice recognition data. Data corresponding to the local information (explained later in detail) are also stored in the map-data media. Alternatively, these various data may be received through the network without storing in the memory.

As the display panel 26 displaying color images, any display panel may be used, such as a liquid crystal display panel, an organic electroluminescent display panel or a cathode ray tube. On the display panel 26, various marks, such as a mark showing a present position detected by the position detector 21, a driving route to a destination and marks showing various facilities, are shown by overlapping on the map inputted from the map-inputting device 25. The speaker 27 delivers various messages inputted from the map-inputting device 25 for guiding a driver. The microphone 28 inputs voice commands or other voice information from the driver to the control device 29.

The on-board LAN communication device 30 connected to an on-board LAN communicates with electronic control units (ECU) which are also connected to the on-board LAN. The control device 29 is a known device constituted by a microcomputer including CPU, ROM, RAM, SRAM and I/O, interconnected through a bus line. The control device 29 is operated according to programs stored in the ROM and RAM. For example, the control device 29 calculates a present position of a vehicle based on inputs from the position detector 21 and shows the present position on the map displayed on the display panel 26. The control device 29 calculates an optimum driving route from the present position to a destination inputted through the input switches 22. The calculated driving route is shown on the map displayed on the display panel 26. Further, the control device 29 sends signals for voice guidance to the speaker 27. A route calculation process, an automatic route calculation process, a guidance process and a process for giving local information, which are characteristic to the present invention, will be described below with reference to respective flowcharts.

Figure 2:
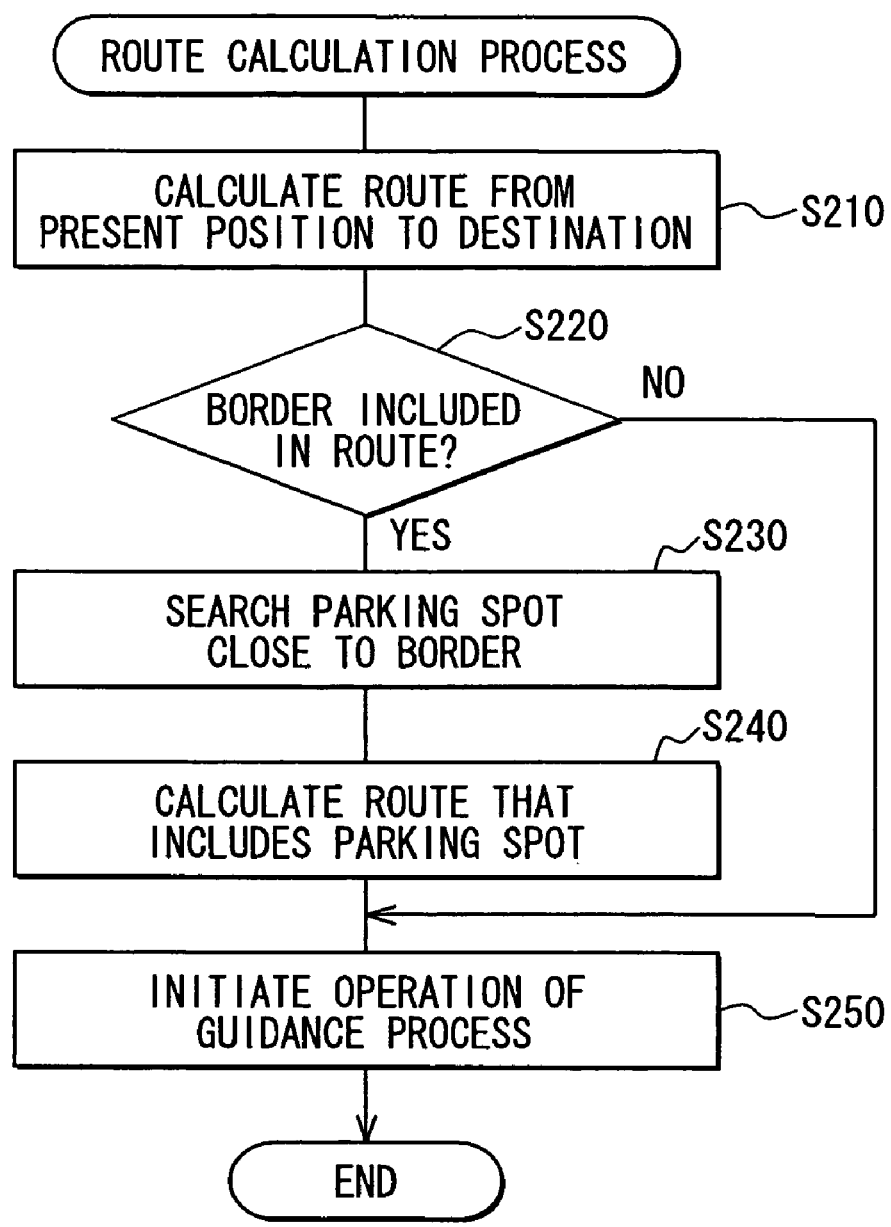
FIG. 2 is a flowchart showing a process of calculating a driving route.

With reference to FIG. 2, the process of calculating a driving route (the route calculation process) will be described. This process starts when the user inputs a destination and a command to calculate a driving route through the input switches 22 or the remote controller 23b. At step S210, a driving route from the present position to the destination designated by a driver is calculated. The present position is calculated based on the inputs from the position detector 21, and the data inputted from the map data inputting device 25 are used as a map data.

At step S220, whether a national border is included in the calculated driving route is determined, using the map data inputted from the inputting device 25. If the national border is included, the process proceeds to step S230, and if not, the process proceeds to step S250. At step S230, a parking spot, which is closest to the border and where an automotive vehicle is able to park at least temporarily (simply referred to as a parking spot) is searched on the map. That is, the parking spot which is closest to a point where the driving route crosses the border is searched. At step S240, a driving route from the present position to the destination is re-calculated, so that the new driving route includes the parking spot. The new route is memorized in the control device 29. At step S250, the guidance process (explained later in detail) is initiated, and the process comes to the end. In the case where it is determined that no border is included at step S220, the process directly proceeds to step S250 and then comes to the end.

Figure 3:
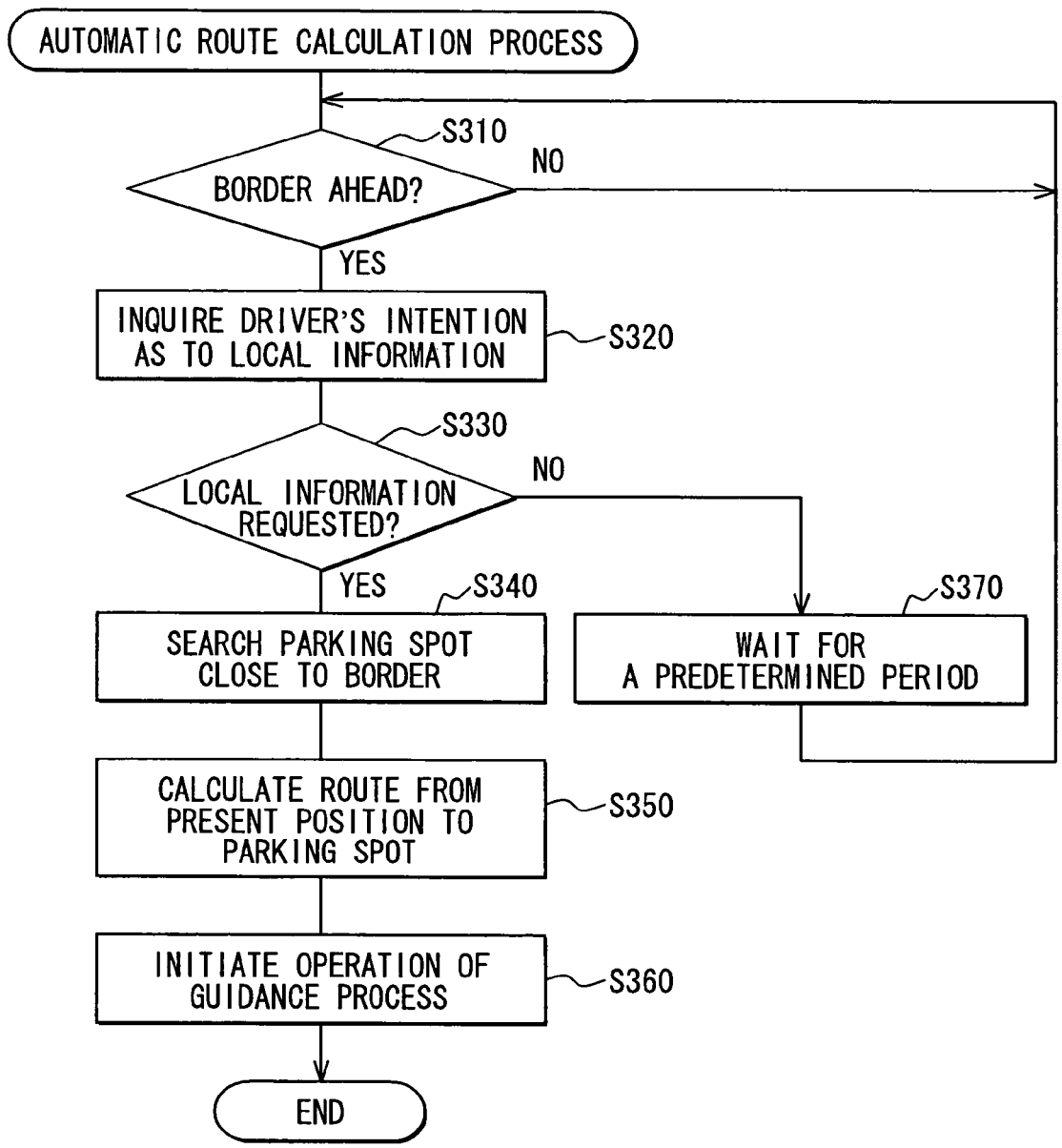
FIG. 3 is a flowchart showing a process of automatically calculating a driving route.

With reference to FIG. 3, the process of automatically calculating a driving route (the automatic route calculation process) will be described. This process is automatically initiated without inputting a driver's command to calculate a driving route. However, this process is carried out only when no other processes (i.e., the route calculation process, the guidance process and the process of giving local information) are being carried out. Accordingly, the automatic route calculation process is brought to the end when the route calculation process is initiated, and starts again when the route calculation process comes to the end.

Upon initiation, the automatic route calculation process proceeds to step S310. At step S310, whether the vehicle is going to cross a national border within a predetermined period (e.g., 15 minutes) is determined. This determination is performed based on a past trace of the vehicle position supplied from the position detector 21 and the map data fed from the inputting device 25. If it is determined that the vehicle is going to cross the border, a point of crossing the border is calculated at the same time.

If it is determined that the vehicle is not going to cross the border, the process returns to step S310. If the vehicle is going to cross the border, the process proceeds to step S320. At step S320, the driver is inquired whether he/she wants to stop at a parking spot close to the border to receive the local information. This inquiry is made by displaying the inquiry on the display panel 26 or by announcing through the speaker 27. At step S330, whether or not the driver inputs his/her intention to stop at the parking spot to receive the local information is checked. If the driver is affirmative, the process proceeds to step S340, and if negative, the process proceeds to step S370.

At step S370, the process stays there for a while (e.g., 15 minutes) and returns to step S310. At step S340, a parking spot closest to the crossing point (the calculated point where the vehicle is going to cross the border) is searched on the map data. At step S350, a driving route from the present position to the parking spot is calculated. At step S360, the guidance process (explained later in detail) is initiated, and then the process comes to the end.

Figure 4:
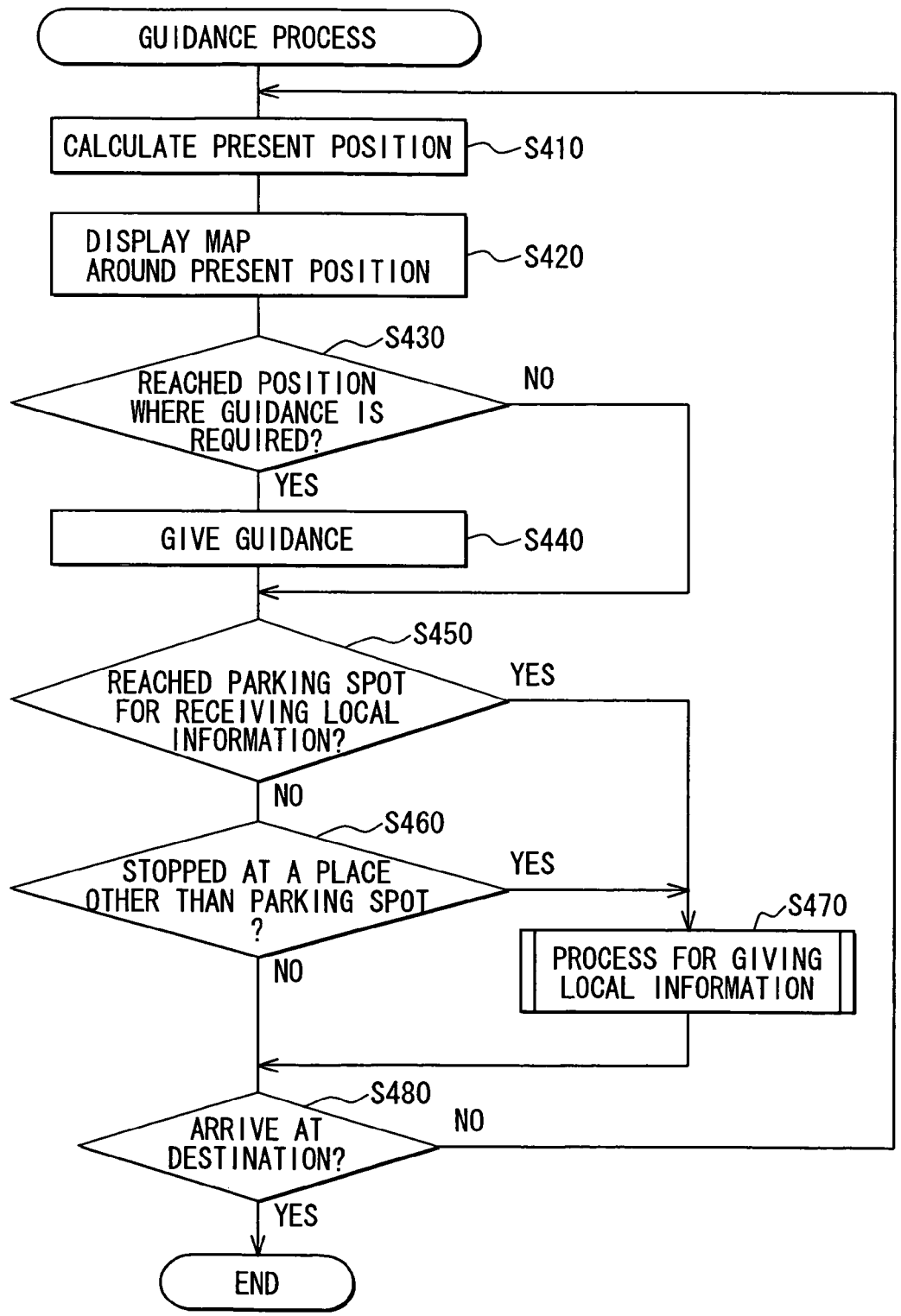
FIG. 4 is a flowchart showing a process of guiding a driver while he is driving and of giving local information while he is parking at a parking spot.

With reference to FIG. 4, the guidance process will be described. This process is initiated at step S250 of the route calculation process or at step S360 of the automatic route calculation process. Upon initiation of the process, the process proceeds to step S410. At step S410, a present position of the vehicle is calculated based on the inputs from the position detector 21. At step S420, a map around the present position is displayed on the display panel 26. At step S430, whether the present position is one of the positions where the guidance is to be given is determined. For example, a position before an intersection or a position before a point where a road branches out is one of the positions where the guidance is to be given. This judgment is carried out based on the map data.

Figure 6A:
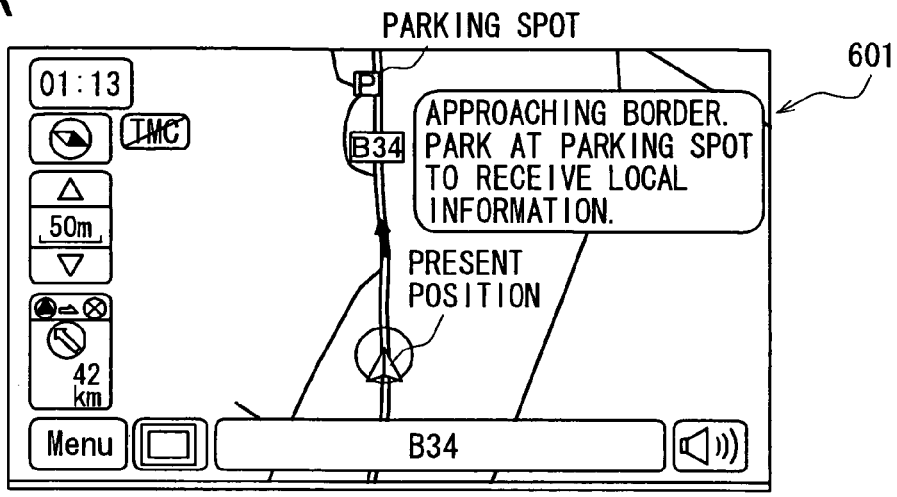
FIGS. 6A-6C are display panels showing instructions and local information thereon.
Figure 6B:
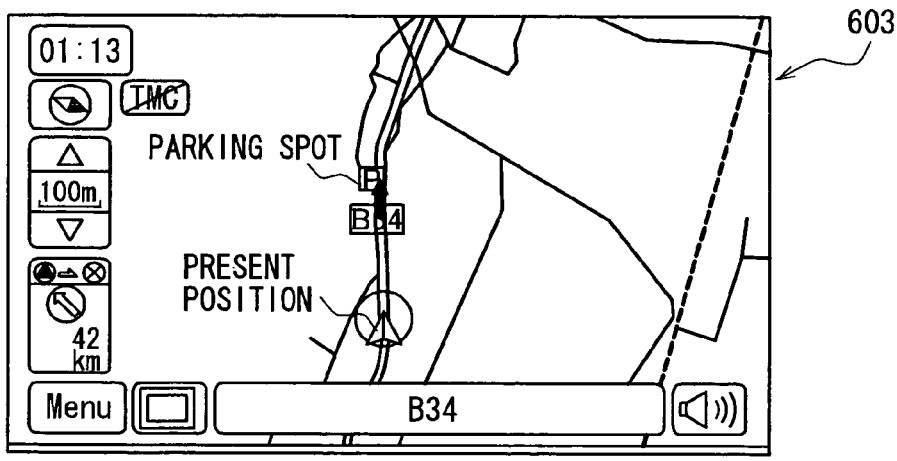

If the present position is the position where the guidance is to be given, the process proceeds to step S440, and if not, the process proceeds to step S450. At step S440, a guidance such as "turn right at the next intersection" is given to the driver by displaying on the display panel 26 or by announcing through the speaker 27. Some examples of display frames displayed on the display panel 26 are shown in FIGS. 6A and 6B. A display frame 601 shown in FIG. 6A shows the present position of the vehicle by an arrow and a parking spot located ahead by a "P" mark. The display frame 601 also shows a message telling the driver that the vehicle is approaching a border and instructing him/her to stop at a parking spot to receive local information. A display frame 603 shown in FIG. 6B informs the driver that the vehicle has come closer to the parking spot.

Referring to FIG. 4 again, steps following step S440 will be described. At step S450, whether the vehicle reached the parking spot where the local information is given is determined. The parking spot is a spot searched either at step S230 of the route calculation process or at step S340 of the automatic route calculation process. If the vehicle reached the parking spot (i.e., if the present position is the parking spot), the process proceeds to step S470, and if not, the process proceeds to step S460. At step S470, the process for giving local information (explained later in detail) is initiated, and then the process proceeds to step S480. At step S460, whether the vehicle has parked at a place other than the paring spot, which is located within a predetermined distance from the border, is checked. The predetermined distance may be set to such a distance that requires 30 minutes drive, for example.

If the vehicle is parking at the place which is located within a predetermined distance from the border, the process proceeds to step S470, and if not the process proceeds to step S480. At step S480, whether the vehicle arrived at the destination is determined. If the vehicle arrived at the destination, the process comes to the end, and if not, the process returns to step S410 to repeat this guidance process.

Figure 5:
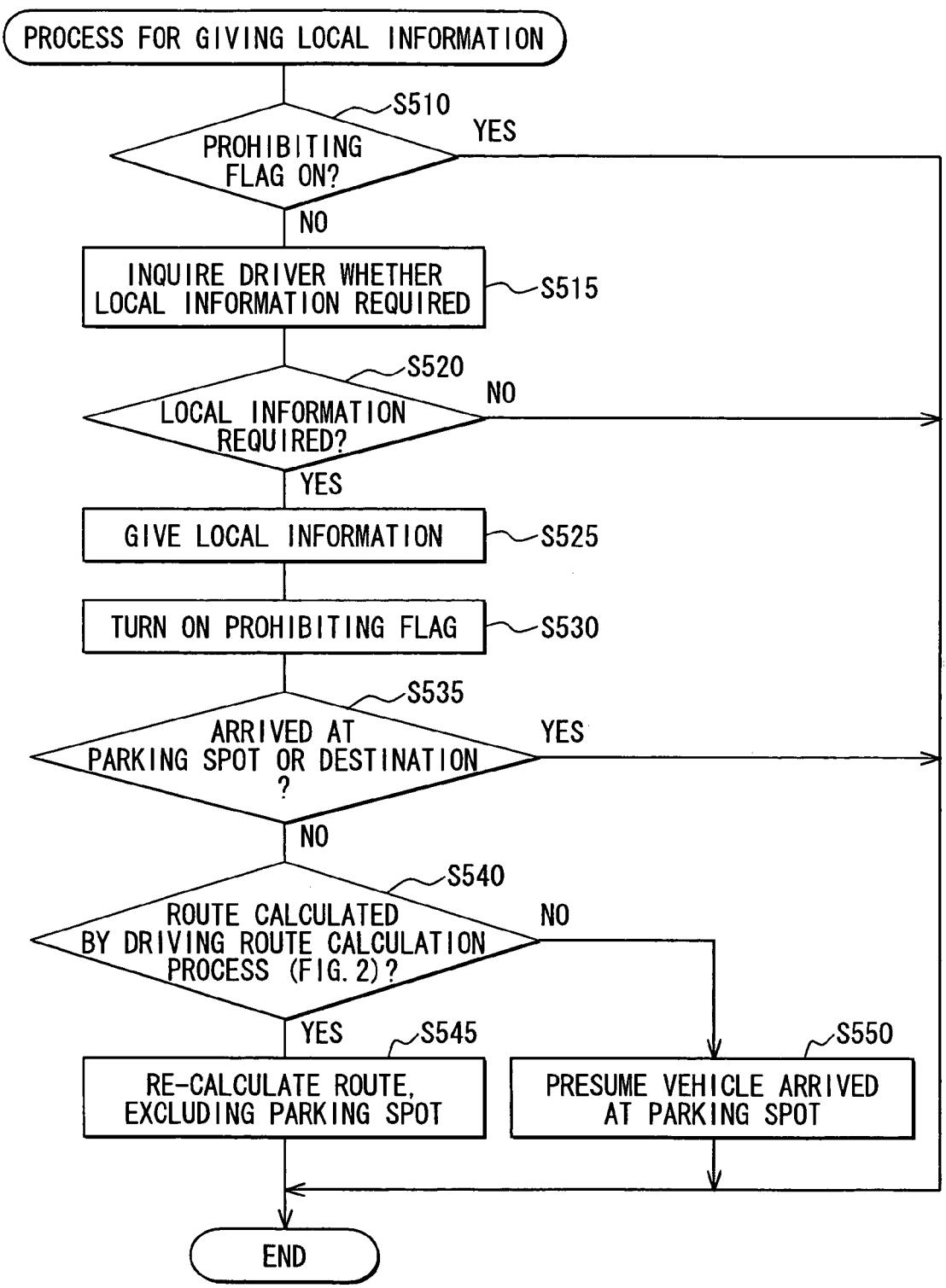
FIG. 5 is a flowchart showing a detailed process for giving the local information to the driver.

With reference to FIG. 5, the process for giving the local information will be described. This process is initiated at step. S470 of the guidance process. At step S510, whether a prohibiting flag that prohibits operation of this process is turn on or not is checked. The prohibiting flag is turned off (initialized) when the route calculation process or the automatic route calculation process comes to the end. If the prohibiting flag is turned on, the process comes to the end, and if not, the process proceeds to step S515.

Figure 6C:
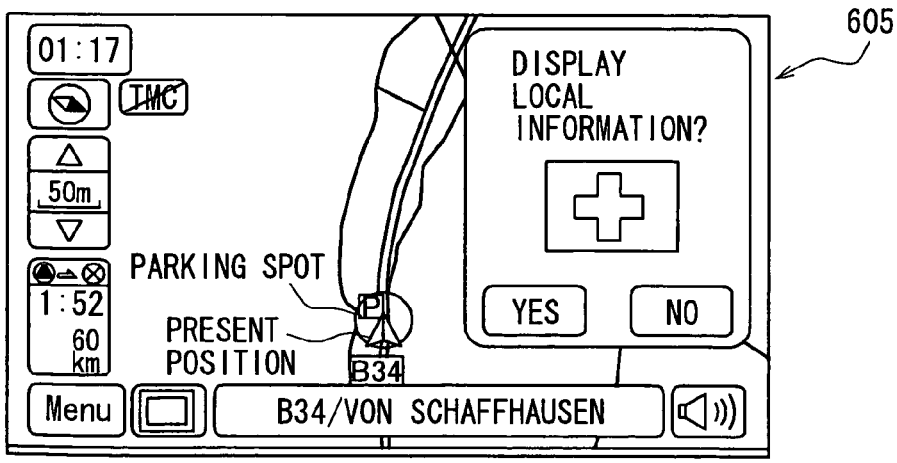

At step S515, whether the driver wants to receive the local information or not is inquired. More particularly, such inquiry is displayed on the display panel 26 or announced through the speaker 27. A display frame 605, on which the inquiry as to whether the driver wishes to receive the local information is displayed, is shown in FIG. 6C as an example. The present position of the vehicle is shown by an arrow, and the parking spot is shown by a "P" mark. The arrow overlaps the P mark, meaning that the vehicle is in the parking spot. On the display frame 605, a message inquiring the driver's intention as to whether he/she wants to receive the local information is also shown. The driver selects either NO or YES shown on the display frame 605.

At step S520, whether the driver selects YES or not is checked. If the driver selects YES, the process proceeds to step S525, and if not, the process comes to the end of this process and continues to steps following step S470 of the guidance process. At step S525, the local information including traffic regulations in that country is given to the driver. Details of the local information will be explained later. At step S530, the prohibiting flag is turned on upon completion of giving the local information.

At step S535, whether the vehicle is at either one of the parking spot and the destination is checked. If it is determined that the present position of the vehicle is the parking spot or the destination, the process comes to the end of this process and proceeds to steps following the step S470 of the guidance process, and if not, the process proceeds to step S540. At step S540, whether the present route is the route that is calculated in the route calculating process is determined. If the present route is calculated in the route calculation process (the process shown in FIG. 2), the process proceeds to step S545, and if not (this means that the driving route is calculated in the automatic route calculation process shown in FIG. 3), the process proceeds to step S550. At step S545, a new driving route from the present position to the destination is re-calculated, canceling the parking spot which is set before. Then, the process comes to the end of this process and proceeds to steps following step S470 of the guidance process. At step S550, it is presumed that the vehicle arrived at the parking spot searched in the automatic route calculation process, and the process comes to the end of this process and proceeds to steps following step S470 of the guidance process.

Figure 7A:
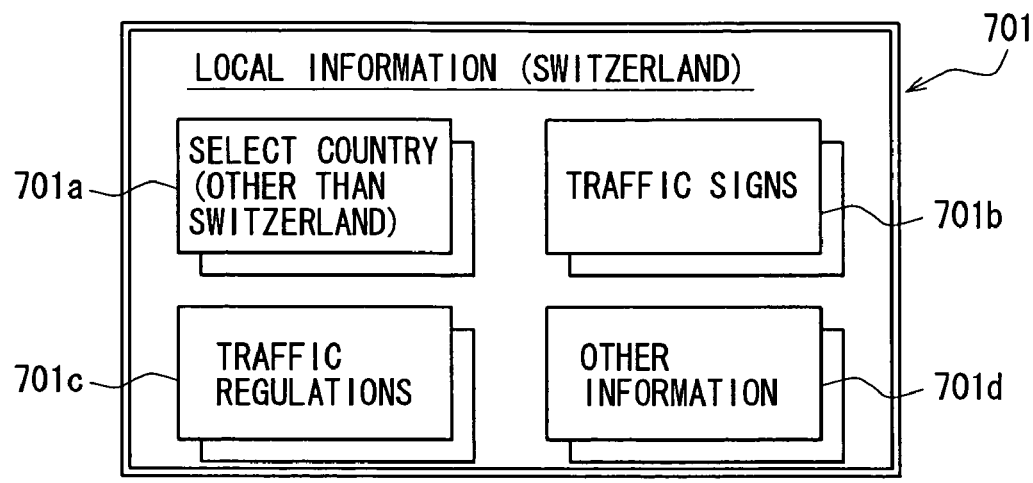
FIGS. 7A and 7B are display panels showing traffic sings and other information thereon.
Figure 7B:
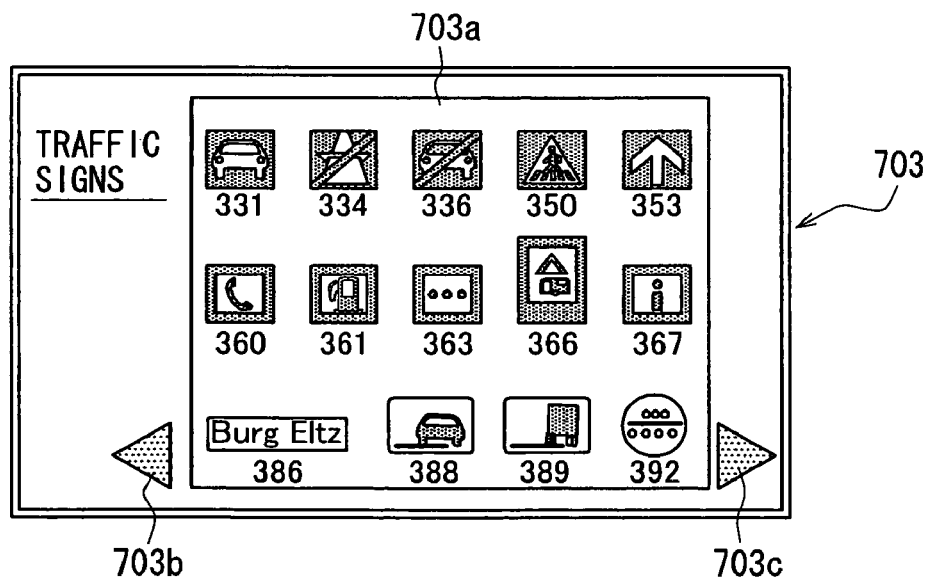

An example of the step S525 for giving the local information to the driver will be explained with reference to FIGS. 7A and 7B. The display frame 701 shown in FIG. 7A is displayed on the display panel 26 when the vehicle enters Switzerland (as an example). The display frame 701 includes a button 701a for selecting countries other than Switzerland, a button 701b for requesting a display of traffic signs, a button 701c for requesting a display of traffic regulations, and a button 701d for requesting a display of other information. These buttons are formed as a touch panel on the display frame.

When the button 701a for selecting countries is pushed, a list of countries is displayed so that the driver can select any one of the countries. When the button 701b is pushed, traffic signs used in Switzerland are displayed, as shown in a display frame 703 in FIG. 7B. The display frame 703 includes an area 703a for displaying the traffic signs, a button 703b for selecting forward display frames, and a button 703c for selecting backward display frames. When a traffic sign displayed on the area 703a is selected by touching it, detailed explanation of the selected traffic sign is displayed on the display panel. Instead of touching the display panel, a traffic sign may be selected by inputting a number shown under the traffic sign from the input switches 22. By touching the forward button 703b, a display frame next to the present frame is shown, and by touching the backward button 703c, a previously shown display frame is shown.

The following advantages are attained in the present invention. When a destination is inputted by a driver, a driving route from the present position to the destination is calculated. If the driving route crosses a national border, a parking spot close to the border where a driver stops for a while to obtain local information including traffic regulations in the country which he is entering is searched. At the parking spot the driver is able to obtain the local information while he/or she is parking. The driver is able to concentrate on obtaining the local information without being interfered with driving a vehicle. When a destination is not inputted by the driver, the navigation device automatically searches the parking spot which is closest to the border the vehicle is going to cross. The driver is able to obtain the local information while he is parking at the parking spot. In this manner, the driver is able to obtain more detailed local information while he/she is not driving, and therefore safety in driving can be ensured.

In the case where the driver stops at a place other than the parking spot designated by the navigation device, the place being close to the border and located before arriving at the border, the driver can obtain the local information at that place if he/she wants. If the driver obtains the local information at that place, the parking spot designated by the navigation device is canceled, and he/she is able to drive without stopping at the parking spot. This provides the driver with convenience.

The present invention is not limited to the embodiment described above, but it may be variously modified. For example, the border is not limited to the national border, but it may be a state border or any regional border, between both sides of which the traffic regulations are different. Further, the local information is not limited to the traffic regulations, but it may include languages, manners, exchange rates, sanitary situations, and so on. Traffic sings (FIG. 7B) used at both sides of the border in difference forms or styles to designate the same thing may be displayed on the display panel 26 as a pair. This will provide a driver with more convenience. The traffic sings first displayed on the display frame 703 may be those which are most frequently used. Further, such traffic signs may be arranged on the display frame 703 in an order of frequency in usage.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A navigation device for use in an automotive vehicle, comprising:
   input means for inputting map information and a destination into the navigation device;
   control means for
      calculating a driving route from a starting point to the inputted destination based on the inputted map information,
      determining whether a border is included in the driving route that the automotive vehicle is going to cross, both sides of the border having regulations and customs including different traffic regulations, and
      when the border is included in the driving route,
         locating a parking spot that is close to the border, the parking spot being defined as a spot where the automotive vehicle is able to be parked, and
         recalculating a new driving route that includes the located parking spot close to the border;
   guiding means for guiding a driver according to one of the driving route calculated by the control means and the new driving route recalculated by the control means; and
   feeding means for feeding local information regarding customs and regulations including traffic regulations on the side after the automotive vehicle crosses the border,
   the guiding means for further providing the local information fed by the feeding means to the driver while the automotive vehicle stops at the parking spot where the automotive vehicle is able to be parked at least temporarily,
   the control means for further determining whether the vehicle stops at the parking spot, and
   the guiding means for further providing the local information fed by the feeding means to the driver when the control means determines that the vehicle stops at the parking spot.

2. The navigation device as in claim 1, further including means for obtaining positional information which is necessary to specify a position of the automotive vehicle, and the means for obtaining positional information further for specifying the starting point to the control means for calculating the driving route.

3. A navigation device for use in an automotive vehicle, comprising:
   positional means for obtaining positional information and specifying a position of the automotive vehicle;
   input means for inputting map information into the navigation device; and
   calculating means for
      calculating a driving route based on the position of the automotive vehicle, the map information, and a past locus of the driving route, from a present position specified by the positional means to a destination,
      detecting a border that the automotive vehicle is going to cross included in the calculated driving route, both sides of the border having regulations and customs including different traffic regulations, and
      finding a parking spot included in the calculated driving route based on the detected border, the parking spot being defined as a spot where the automotive vehicle is able to park at least temporarily;
   guiding means for guiding a driver according to the driving route calculated by the calculating means; and
   feeding means for feeding local information regarding customs and regulations including traffic regulations to the navigation device,
   the guiding means for further providing the local information fed by the feeding means to the driver while the automotive vehicle stops at the parking spot,
   the calculating means for further determining whether the vehicle stops at the parking spot, and
   the guiding means for further providing the local information fed by the feeding means to the driver when the calculating means determines that the vehicle stops at the parking spot.

4. The navigation device as in claim 2, further comprising the parking spot included in the driving route being located at a position before the border.

5. The navigation device as in claim 3, further comprising the parking spot included in the calculated driving route being located at a position before the border.

6. The navigation device as in claim 1, wherein the guiding means for further providing the local information to the driver when the automotive vehicle stops at a place which is located within a predetermined distance from the border before the automotive vehicle reaches the parking spot.

7. The navigation device as in claim 6, wherein
   the guiding means for further ceasing the local information being provided to the driver at the parking spot.

8. The navigation device as in claim 3, further comprising display means for displaying the driving route including the border and the parking spot.

9. A navigation device for use in an automotive vehicle, comprising:
   means for memorizing map information;
   means for obtaining positional information for specifying a present position of the vehicle;

determining means for determining that the vehicle is approaching a border memorized in the map information, regulations and customs being different between both sides of the border;

calculating means for calculating a driving route that includes a parking spot close to the border, the parking spot being defined as a spot where the automotive vehicle is able to be parked at least temporarily, based on the approaching border determined by the determining means;

obtaining means for local information regarding customs and regulations including traffic regulations in the side after the automotive vehicle crosses the border;

guiding means for providing the local information obtained by the obtaining means to a driver while the automotive vehicle stops at the parking spot; and means for determining whether the vehicle stops at the parking spot included in the driving route, the guiding means for further providing the local information fed by the feeding means to the driver while it is determined that the vehicle stops at the parking spot.

10. The navigation device as in claim 9, wherein:

the calculating means further for recalculating the driving route from the present position to a new destination;

the determining means for further determining whether the recalculated driving route crosses the border;

the calculating means further for recalculating the driving route that includes the parking spot close to the border based on the border of the recalculated driving route determined by the determining means.

11. The navigation device as in claim 9, further comprising:

the determining means for further determining that the vehicle is approaching the border based on a past locus of the driving route; and the calculating means for further calculating another driving route from the present position to the parking spot located close to a border.

12. The navigation device as in claim 9, further comprising display means for displaying the driving route including the border and the parking spot.

13. The navigation device as in claim 1, wherein the parking spot included in the driving route is located at a position after the border.

14. The navigation device as in claim 1, further comprising display means for displaying the driving route including the border and the parking spot.

15. A computer readable storage medium comprising instructions for execution by a computer, the instructions, which, when executed, would cause the computer to perform the steps of:

calculating a driving route from a starting point to an input destination based on input map information;

determining whether the driving route includes a border, the border having two sides existing before and after the vehicle crosses the border, the two sides of the border having different traffic regulations from each other;

determining whether the vehicle is going to cross the border;

recalculating, when determining that the vehicle is going to cross the border, a new driving route including a spot close to the border, the spot at which the vehicle is able to be parked at least temporarily;

guiding a driver according to the recalculated driving route including the spot;

determining whether the vehicle stops at the spot included in the recalculated driving route; and notifying the driver, while it is determined that the vehicle stops at the spot included in the recalculated driving route, with different traffic regulations in the side existing after the vehicle crosses the border.

* * * * *